No. 844,997. PATENTED FEB. 19, 1907.
H. H. CUTLER.
PHASE SPLITTER AND CLUTCH.
APPLICATION FILED AUG. 7, 1905.
2 SHEETS—SHEET 1.
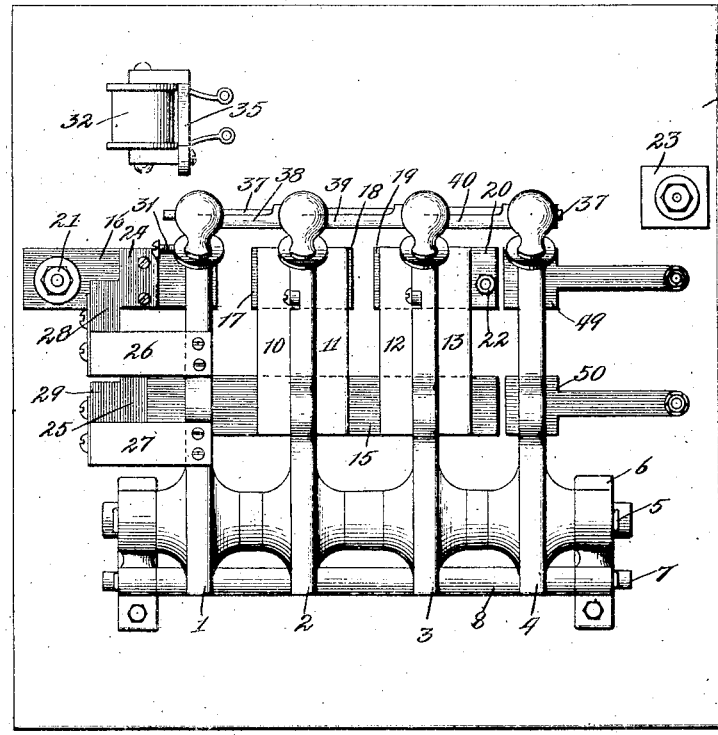
Witnesses:
Inventor:
Henry H. Cutler
By Jones & Addington
Attys No. 844,997. PATENTED FEB. 19, 1907.
H. H. CUTLER.
PHASE SPLITTER AND CLUTCH.
APPLICATION FILED AUG. 7, 1905.
2 SHEETS—SHEET 2.
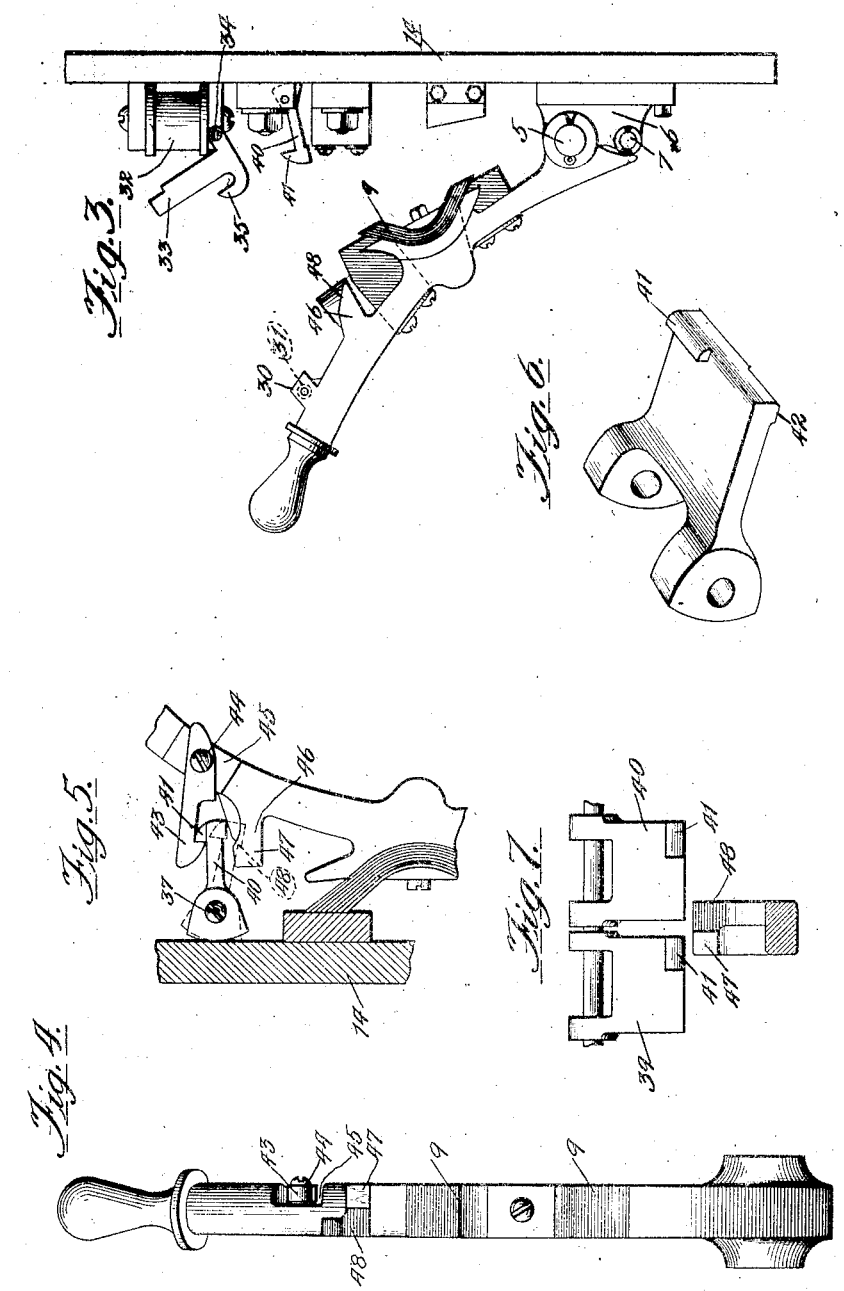
Witnesses:
Inventor:
Henry H. Cutler
By James & Addington
Attys

UNITED STATES PATENT OFFICE.

HENRY H. CUTLER, OF MILWAUKEE, WISCONSIN, ASSIGNOR TO THE CUTLER-HAMMER MFG. CO., OF MILWAUKEE, WISCONSIN, A CORPORATION OF WISCONSIN.

PHASE-SPLITTER AND CLUTCH.

No. 844,997.	Specification of Letters Patent.	Patented Feb. 19, 1907.

Application filed August 7, 1905. Serial No. 273,133.

*To all whom it may concern:*

Be it known that I, HENRY H. CUTLER, a citizen of the United States, residing at Milwaukee, in the county of Milwaukee and State of Wisconsin, have invented new and useful Improvements in Phase-Splitters and Clutches, of which the following is a full, clear, concise, and exact description, reference being had to the accompanying drawings, forming a part of this specification.

My invention relates to improvements in means for starting single-phase motors under no load and imposing the load thereon after the motor has attained speed.

My invention contemplates particularly the provision of a combined phase-splitter for starting the motor and a switch for closing the circuit through a magnetic clutch adapted to impose the load upon the motor after the same has started and attained speed.

I have illustrated my invention in the accompanying drawings, in which—

Figure 1 is a front elevation of the switch of my invention. Fig. 2 is a diagrammatic view illustrating the circuit arrangement of my invention in connection with a single-phase motor and a magnetic clutch. Fig. 3 is a side view thereof. Fig. 4 is a detail view of one of the switch-levers. Fig. 5 is a detail view of the mechanism for holding the levers in a closed position. Fig. 6 is a detail view of one of the dogs employed, and Fig. 7 is a sectional top view of one of the levers and a top view of the coöperating rocking dogs.

In constructing my invention switch-levers 1, 2, 3, and 4 are suitably pivoted or journaled at one end and provided at their opposite ends with handles. I have shown the several levers as journaled upon a shaft or rod 5, mounted in arms upon brackets 6. The brackets 6 also support a rod 7, which is threaded through a rubber tube 8, serving as a cushion or buffer against which the extended ends of the arms or levers are adapted to impinge when thrown open. The first lever 1 forms a single-pole switch and carries a contact device 9, made in the usual form from a number of strips of copper laid face to face, the free ends thereof being adapted to engage the contact-surfaces to complete the circuit therethrough. The levers 2 and 3 are provided with arms 10 and 11 and 12 and 13, respectively, and thereby form two double-pole switches. Each arm of the double-pole switch carries a contact device of the same construction as the contact device 9. Upon the base-board 14 is mounted a contact-bar 15, with which one end of the contact device 9 of each of the levers 1, 2, and 3 is adapted to engage, the other end of said device being adapted to engage one of the contact-terminals 16, 17, 18, 19, and 20. Upon the terminal 16 is provided a binding-post 21, by which the same may be connected with one side of the supply-circuit. Upon the terminal 20 is provided a binding-post 22, whereby the same may be connected with one set of field-coils of the motor, and a second binding-post 23 is provided upon the base 14, to which is connected the other set of field-coils of the motor. Upon the terminal 16 is mounted a carbon block 24, and a similar carbon block 25 is mounted upon the end of the contact-bar 15.

The first switch-arm 1 carries laterally-extending arms 26 and 27, supporting upon their ends carbon blocks 28 and 29, respectively. When the switch-arm 1 is moved to close the circuit, the block 29 engages block 25 and block 28 engages block 24, thereby closing the circuit from terminal 16 to the terminal 15. The further movement of the switch-arm causes the contact device 9 to directly close together terminals 15 and 16. Likewise when the switch-arm is moved outward the contact device 9 leaves terminals 15 and 16 before the carbon blocks separate, so that any arc which may be formed by the opening of the circuit will take place between the carbon blocks instead of the metallic surfaces. Near the upper end of the switch-arm 1 a lug 30 is provided, which carries a laterally-extending rod 31, which may take the form of a screw. Mounted upon the base 14 above the arm is a retaining-magnet 32, having an armature 33, pivoted at 34. The armature 33 of the magnet carries a laterally and upwardly extending lug 35, and when the arm 1 is moved to close the circuit the rod 31 engages the side of the armature to move the same against the magnet-pole and the magnetism of the magnet 32 retains the armature in this position. The swinging in of the armature carries the lug 35 upon the exterior of the rod 31, so that the rod will rest in the slot formed between the lug 35 and the face of the armature, and as long as the magnet 32 remains energized the arm 1 will be held in a closed position. When, however, the magnet is deënergized, the weight of the arm will carry the same to the position shown in Fig. 3, thereby rocking the armature 33 upon its pivot, as shown. Mounted upon a rod or shaft 37, supported on suitable bearings upon the base 14, are rocking dogs 38, 39, and 40. Each dog has its rear end so shaped as to engage the base-plate 14 and limit the downward movement thereof when free. Upon the outer end of the dog to the right an upwardly-extending lip 41 is provided, which has its front edge curved and its rear edge perpendicular to the upper surface of the dog. The under side of the dog has a lip 42 extending throughout its entire length, which is rounded off at its left-hand edge. The levers 2, 3, and 4 are each provided with a latch 43, pivoted to the arm at 44 and set in a slot 45. The wall of the slot limits the vertical movement of the latch relatively to the arm. Below the latch and formed integrally with the arm is a lug 46, projecting toward the base-plate, and consists of two parts 47 and 48, the part 47 being squared in section and flat upon the end, and when the lever is in a position to close the circuit presents a vertical surface. The upper part or the portion 48 is inclined or chamfered at an acute angle.

The lever 4 forms a single-pole switch and is of the same general construction as the lever 1, the contact device thereof being adapted to close the circuit between the terminals 49 and 50. The terminal 49 is adapted to be connected with one terminal of the winding of the clutch and the other terminal 50 is adapted to be connected with one side of the supply-circuit.

In Fig. 2 I have shown a diagrammatic view of the circuit arrangement of my device, and it will be noted that one side 51 of the supply-main branches so as to include two sets of coils in parallel. I have shown four field-coils 52, 53, 54, and 55, but it will be understood that I have only selected this number for the purpose of illustration. One side 51 of the supply-main is connected, through the coils 52 and 53 by conductor 56, with the binding-post on the contact 20. The contact 20 is connected with one end of a non-inductive resistance 57, the opposite end thereof being connected by conductor 58 with the contact-bar 15. At an intermediate point the non-inductive resistance is connected by conductor 59 with the contact 18. A branch 60 of the main 51 is connected through the field-coils 55 and 54 by conductor 61 with the binding-post 23, which in turn is connected by conductor 62 with the contact 19, said contact being also connected with one end of the inductive resistance 63. The opposite end of the resistance 63 is connected by the conductor 58 with the contact 15, and at an intermediate point is connected by conductor 64 with the contact 17. The contact 16 is connected by conductor 65 with the opposite side 66 of the supply-main. The retaining-magnet 32 and the clutch 67 are supplied with a direct current from any suitable source. In the present instance, however, they are illustrated as receiving a direct current from the alternating-current mains 51 and 66 through the interposition of a rectifier 68. This rectifier may be of any desirable construction and is illustrated as a rectifier of the aluminium-iron type, in which the longer transverse lines 69 represent, say, iron, while the shorter lines 70 represent aluminium. The current from the alternating-current circuit will pass between these metals in one direction only. Accordingly with the cells disposed as illustrated a rectified current will be delivered to the retaining-magnet and to the clutch. The terminals 71 and 72 of the rectifier are connected by conductors 73 and 74 with the supply-mains 51 and 66. One terminal 75 of the rectifier is connected by conductor 76 with one side of the winding of the magnet 32, the opposite side of the winding being connected by conductor 77 with the terminal 78 of the rectifier. The terminal 75 of the rectifier is also connected by the conductor 79 with the contact 50, while the contact 49 is connected by conductor 80, through the winding of the clutch 67, with the terminals 78 of the rectifier.

In operation, assuming that it be desired to start the motor and impose the load thereon, the main switch having been closed, the switch-arm is first closed to close the circuit between the carbon blocks and finally to connect together the terminals 15 and 16 directly through the contact device 9. The armature 33 is engaged by the pin 31 and moved against the pole of the retaining-magnet 32. The retaining-magnet thus serves to maintain the switch-arm 1 in a closed position. Current may be traced from the supply-main 66 by conductor 65 to contact 16, across the switch-arm 1 to contact-bar 15, where it will divide, part thereof passing through the non-inductive resistance 57 to contact 20 and thence by conductor 56, through the field-coils 53 and 52, back to the opposite supply-main 51. The other part of the current will pass through the inductive resistance 63, thence by conductors 62 and 61, through the field-coils 54 and 55, back to the opposite main 51. A direct current at the same time will pass through the rectifier 68 to the retaining-magnet 32, energizing the same. The closing of the switch-arm 1 causes the part 48 of the lug 46 thereon to engage beneath the dog 38, raising the same. The second switch-arm is now closed, and as the dog 38 is in its raised position the latch 43 of the arm 2 will engage the vertical wall thereof, and the switch-arm will thus be held in a closed position. A section of each of the resistances 57 and 63 will be cut out, and an additional amount of current will be admitted to the field-coils of the motor, thus increasing the speed of the same. The wall 48 of the lug 46 on the arm 2 will engage and lift the second rocking dog 39, so that when the arm 3 is closed the latch 43 thereof will be engaged and held by the lip 41 of the dog. When the arm 3 is closed, the remainder of the resistance is cut out, and the motor attains full speed. The closing of the arm 3 causes the wall 48 of the lug 46 thereon to engage and lift the third rocking dog, so that when the arm 4 is closed the latch 43 thereof will engage the lip 41 of the rocking dog and hold this last arm closed. The closing of the arm 4 closes the circuit through the clutch-winding, and the clutch is energized to connect the motor with its load. If it is desired to disconnect the load from the motor and stop the same, the retaining-magnet 32 may be deënergized in any suitable manner, and the arm 1 will be released and fly outward. In moving outward the first rocking dog is permitted to fall and the latch of the second switch-arm is thus released, permitting the second switch-arm to likewise fly outward. This permits the second rocking dog to fall and allows the third switch to open, which in turn permits the third rocking dog to fall, allowing the fourth switch to open, whereby all the switch-arms are released and the circuit to the motor is opened, as well as the circuit to the magnetic clutch.

Having thus described my invention, what I claim as new, and desire to secure by Letters Patent, is—

1. The combination with a motor, of a phase-splitter, comprising a plurality of resistances of different character, a magnetic clutch mechanism, and a plurality of switches actuatable consecutively for controlling said resistances and said clutch.

2. The combination with a motor, of a phase-splitter, having a plurality of resistances of different character, a magnetic clutch, a plurality of independently-actuated switches controlling said resistances and said clutch, and means for preventing the closure of said switches except in a definite order.

3. The combination with a motor, of a phase-splitter, having a plurality of resistances of different character, a magnetic clutch, a plurality of independently-actuated switches for controlling said resistances and said clutch, and means for holding said switches in closed position.

4. The combination with a motor, of a phase-splitter, having a plurality of resistances of different character, a magnetic clutch, a plurality of independently-actuated switches for controlling said resistances and said clutch, and an electromagnetic retaining mechanism for holding said switches in a closed position.

5. The combination with a motor, of a phase-splitter, having a plurality of resistances of different character, a magnetic clutch, a plurality of independently-actuated switches for controlling said resistances and said clutch, and electromagnetic retaining mechanism for holding said switches in their closed positions, and means for supplying the same and the clutch with a direct current.

6. The combination with a motor, of a phase-splitter, having a plurality of resistances of different character, a magnetic clutch, a plurality of independently-actuated switches for controlling said resistances and said clutch, means for preventing the closure of said switches except in a definite order, and a retaining mechanism for holding said switches in a closed position.

7. The combination with a motor, of a phase-splitter, having a plurality of resistances of different character, a magnetic clutch, a plurality of independently-actuated switches arranged in mechanical series for controlling said resistances, an interlocking mechanism whereby each switch controls the next succeeding switch, and a retaining-magnet for the first switch of the series.

8. The combination with a motor, of a phase-splitter, having a plurality of resistances of different character arranged in parallel paths, a magnetic clutch, a plurality of independently-actuated switches for controlling said resistances and clutch, and means for preventing the closure of said switches except in a definite order.

9. The combination with a motor, of a phase-splitter, having a plurality of resistances of different character arranged in parallel paths, a magnetic clutch, a plurality of independently-actuated switches for controlling said resistances, means for preventing the closure of said switches, except in a definite order, and a retaining mechanism for holding said switches in a closed position.

10. The combination with a motor, of a phase-splitter, having a non-inductive resistance and an inductive resistance arranged in parallel paths, of a magnetic clutch, and a plurality of switches actuatable consecutively for controlling said resistances and said clutch.

11. The combination with a motor, of a phase-splitter, a non-inductive and inductive resistance arranged in parallel paths, a magnetic clutch, a plurality of independently-operated switches for controlling said resistances and clutch, and means for preventing the closure of said switches except in a definite order.

12. The combination with a motor, of a phase-splitter therefor, having a plurality of resistances of different character, a clutch mechanism, and a plurality of switches actuatable consecutively for controlling said resistances, and an independently-actuated switch for controlling said clutch.

13. The combination with a motor, of a phase-splitter therefor, having a plurality of resistances of different character, a magnetic clutch, a plurality of independently-actuated switches for controlling said resistances, an independently-actuated switch for controlling said clutch, and means whereby said clutch-switch cannot be closed until the switches controlling the resistances have been operated.

In witness whereof I have hereunto subscribed my name in the presence of two witnesses.

HENRY H. CUTLER.

Witnesses:
T. E. BARNUM,
H. J. WIEGAND.